United States Patent [19]

Friesen et al.

[11] Patent Number: 4,877,528

[45] Date of Patent: Oct. 31, 1989

[54] SILOXANE-GRAFTED MEMBRANES

[75] Inventors: Dwayne T. Friesen, Bend, Oreg.; Alan S. Obligin, Catonville, Md.

[73] Assignee: Bend Research, Inc., Bend, Oreg.

[21] Appl. No.: 263,062

[22] Filed: Oct. 27, 1988

[51] Int. Cl.$^4$ .............................................. B01D 13/00
[52] U.S. Cl. .................................. 210/500.29; 55/16; 55/158
[58] Field of Search .................. 55/16, 68, 73, 158, 55/DIG. 30; 528/10, 12, 25, 26, 27, 29; 210/500.34, 500.23, 500.43, 500.21, 640, 654, 450, 655, 321.61, 321.74, 500.23, 500.28, 500.29

[56] References Cited

U.S. PATENT DOCUMENTS 4,527,999 7/1985 Lee ........................................ 55/16

Primary Examiner—Frank Sever
Attorney, Agent, or Firm—Chernoff, Vilhauer, McClung & Stenzel

[57] ABSTRACT

Composite cellulosic semipermeable membranes are disclosed which are the covalently bonded reaction product of an asymmetric cellulosic semipermeable membrane and a polysiloxane containing reactive functional groups. The two reactants chemically bond by ether, ester, amide or acrylate linkages to form a siloxane-grafted cellulosic membrane having superior selectivity and flux stability. Selectivity may be enhanced by wetting the surface with a swelling agent such as water.

7 Claims, No Drawings

SILOXANE-GRAFTED MEMBRANES

The government has rights in this invention under Contract No. DE-AC03-84ER80159 awarded by the Department of Energy.

This invention relates to semipermeable cellulosic membranes useful in selective separations of gases and liquids.

BACKGROUND OF THE INVENTION

Semipermeable asymmetric cellulosic "skinned" separation membranes formed by phase inversion and solvent exchange methods are known. See U.S. Pat. Nos. 3,133,132, 3,432,585, and 3,344,214. Such membranes are characterized by a thin, dense, selectively semipermeable surface "skin" and a less dense void-containing, non-selective support region, with pore sizes ranging from large in the support region to very small proximate to the "skin." Such membranes have a serious shortcoming in that, in operation, fluxes decrease substantially over time. This decrease has been attributed to a collapse of some of the pores near the skinned surface of the membrane, resulting in an undue densification of the surface skin. One attempt at overcoming this problem has been the development of thin film composite or "TFC" membranes, comprising a thin selective skin deposited on a resilient porous support. See, for example, Riley et al., *Applied Polymer Symposium* No. 22, pages 255-267 (1973). While TFC membranes are less susceptible to flux decline than phase inversion-type membranes, fabrication of TFC membranes that are free from leaks is difficult, and fabrication requires multiple steps and so is generally more complex and costly.

One approach to overcoming the problem of leaks in asymmetric membranes has been the fabrication of an asymmetric gas separation membrane comprising a relatively porous and substantial void-containing selective "parent" membrane such as polysulfone or cellulose acetate that would have permselectivity were it not porous, said parent membrane being coated with a liquid such as a polysiloxane or a silicone rubber in occluding contact with the porous parent membrane, the coating filling surface pores and other imperfections comprising voids. See U.S. Pat. No. 4,230,463. However, the coatings of such coated membranes, especially where the coatings are polysiloxane, are subject to degradation by solvents inherently present in the gaseous feed streams of common acid gas separations, and otherwise tend to leach out, thus permitting either flux decline or low selectivity that is characteristic to the uncoated parent membrane.

What is needed, therefore, is an asymmetric membrane that can be inexpensively made by conventional single casting techniques, yet has a high selectivity and flux rate which do not decline in use. These needs and others are met by the present invention, which is summarized and described in detail below.

SUMMARY OF THE INVENTION

The invention comprises a novel siloxane-grafted-cellulosic semipermeable composite membrane comprising the covalently bonded reaction product of an asymmetric cellulosic semipermeable membrane and a polysiloxane, as well as methods of making the same. Grafting of the polysiloxane to the cellulosic membrane can be accomplished by either:

(1) a polycondensation reaction whereby a polysiloxane containing one or more hydroxyl-reactive functional groups is reacted with the hydroxyl groups of the cellulose polymer of the cellulosic membrane; or (2) a polyaddition reaction whereby a polysiloxane containing one or more vinyl, alkynyl, or free radical-forming groups is reacted with the cellulosic substrate.

In both cases, the polysiloxane is grafted to the cellulosic membrane through covalent chemical bonds.

By "hydroxyl-reactive functional groups" is meant any functional group or free radical capable of entering into chemical reaction with a hydroxyl group and forming a covalent bond therewith.

When grafting takes place by means of a polyaddition reaction, either the polysiloxane or the cellulosic membrane, or both, may have vinyl or alkynyl groups. In such cases a free radical initiator, such as an azo, a peroxide or an epoxide must also be used to initiate the grafting.

Alternatively, polyaddition grafting may be accomplished simply by using a polysiloxane having one or more azo, peroxide or epoxide groups.

Such siloxane-grafted membranes may be surface-treated with a non-solvent swelling agent, including water, so as to impart further selectivity thereto in fluid separations.

DETAILED DESCRIPTION OF THE INVENTION

There are essentially two preferred embodiments of the novel siloxane-grafted cellulosic semipermeable composite membranes of the present invention. The first preferred embodiment comprises the use of a cellulosic parent membrane that has a relatively high selectivity due to low porosity, while the second uses a more porous, and hence less selective cellulosic parent membrane.

In the first preferred embodiment, a relatively selective ($CO_2/CH_4$ selectivity of $>15$) asymmetric cellulosic support is cast by conventional phase inversion and dried by conventional solvent exchange methods. The so-prepared support membrane is then subjected to a non-solvent, hydrophobic bath containing either a polymethylhydrosiloxane or a polysiloxane containing reactive functional groups, such reactive functional groups being hydroxyl-reactive, free radical-reactive, or free radical-forming.

In the case of polymethylhydrosiloxanes, the siloxane groups of the same react with the hydroxyl groups of the cellulosic membrane at or near the surface of the cellulosic membrane, preferably in the presence of a catalyst, to form a covalent bond therebetween so as to graft the polysiloxane onto the cellulosic support by chemical bonding of an ether linkage.

In the case of polysiloxanes containing hydroxyl-reactive functional groups, such groups attached to the polysiloxane react with hydroxyl groups at and near the surface of the cellulosic support to form a covalent bond between the hydroxyl-reactive functional groups and the hydroxyl groups between the polysiloxane and the cellulose, thereby to graft the polysiloxane onto the cellulosic support by chemical bonding, typically of an ester or ether linkage.

If the reactive groups of the polysiloxane are free radical-reactive, such as vinyl or alkynyl, a small amount of a free radical initiator, such as an azo, peroxy or expoxy compound, is also typically included in the treatment. Alternatively, radiation such as UV light may be used as a free radical initiator. In either case, the polysiloxane attaches to the cellulose via an addition polymerization reaction that is initiated by a free radical mechanism, the polysiloxane being covalently attached through an ether or carbon-carbon bond.

When the reactive groups of the polysiloxane are free radical-forming, i.e., azo, peroxide, or epoxide, then the polysiloxane attaches or grafts to the cellulosic membrane by a free radical addition reaction such that the polysiloxane is covalently attached through an ether or carbon-carbon bond.

For gas separations, the so-prepared composite graft membrane may be simply dried and used. For liquid separations such as pervaporation or reverse osmosis, the membrane is advantageously rewetted.

As noted above, reactive functional groups include (1) hydroxyl-reactive groups, (2) free radical-reactive groups, and (3) free radical-forming groups, all capable of forming a covalent bond with the cellulosic membrane. Suitable hydroxyl-reactive functional groups include acid halides, amidoacid halides, sulfonyl halides, isocyanate and phosphoryl halides. Free radical-reactive groups include vinyls, alkynyls, and their derivatives. Free radical-forming groups include those that generate free radicals upon being heated or subjected to light, such as azos, peroxides and epoxides.

In the second preferred embodiment of the present invention, a more porous, relatively less selective ($CO_2/CH_4$ selectivity of $<15$) asymmetric cellulosic membrane is prepared and siloxane-grafted in the same manner noted above. Selectivity of the siloxane-grafted membrane is enhanced by wetting the surface of the membrane with a hydrophilic swelling agent such as water, methanol or ethylene glycol while the bulk of the membrane contains a hydrophobic organic liquid that is immiscible with the swelling agent. Upon evaporation, only the surface layer densifies, being restricted from impregnating the cellulosic support portion of the composite membrane by both the residual water immiscible solvent and polysiloxane layer. The swelling agent may include other modifiers such as surfactants (to enhance wetting), plasticizers (to minimize brittleness), and oligomers such as low molecular weight water-soluble polyurethanes (to enhance tensile strength and protect the thin dense surface layer). The swelling agent may be applied by conventional methods such as spraying, fogging, and kiss coating.

"Asymmetry," as used herein, has the conventional meaning in membrane technology, i.e., defining a membrane having a gradient of pore sizes, as opposed to one with substantially uniform pore sizes. Generally, the gradient goes from small pores or a dense film at the surface to large pores away from the surface and toward the interior.

Suitable cellulosic materials from which the asymmetric cellulosic semipermeable membrane may be formed include regenerated cellulose, ethyl cellulose, cyanoethylated cellulose, hydroxypropyl cellulose, cellulose acetate, cellulose diacetate, cellulose triacetate, cellulose propionate, cellulose butyrate, cellulose acetate butyrate, cellulose acetate methacrylate, cellulose nitrate, and blends thereof, as well as blends of such cellulosic materials with compatible miscible polymers such as polyvinylpyridine. In the case of cellulose acetate methacrylate, when the same is reacted with polysiloxane containing methacrylate groups, the covalent bonding is formed y addition polymerization of the vinyl groups on both moieties, thereby grafting the polysiloxane to the cellulosic membrane. And in the case of blends of cellulosic materials with compatible miscible polymers such as polyvinylpyridine, amide bonding may occur as well when the secondary nitrogen sites of the cellulosic support are reacted with, for example, an acid halide-containing polysiloxane.

The form of the membrane may be in flat sheets, modules comprising rolled flat sheets, fibers, hollow fibers, and beads. The preferred form from the standpoint of ease of fabrication is flat sheets, and, as mentioned above, may be prepared by conventional prior art methods. One preferred fabrication method comprises the preparation of a casting dope of cellulose acetate, methanol, acetone and dioxane, followed by casting onto a nylon web, gelling or precipitating by immersion in a cool (0° C. to 40° C.) bath for 2 to 10 minutes, washing, followed by annealing in a hot (40° C. to 95° C.) water bath for 3 to 20 minutes. Thereafter, water may be removed from the wet membrane by solvent exchange with isopropanol and hexane. Typical $CO_2$ and $CH_4$ permeabilities for such asymmetric cellulosic membranes range from 5.0 to 1000 SCFH/ft$^2$.100 psi, with the relatively selective ones having a $CO_2/CH_4$ permeability ratio (or selectivity) of $>15$, typically 15–30, and the less selective ones having a $CO_2/CH_4$ selectivity of $<15$, typically 0.6–10.

The polymethylhydrosiloxane that may be reacted with the hydroxyl groups of the cellulosic membrane is of the general formula

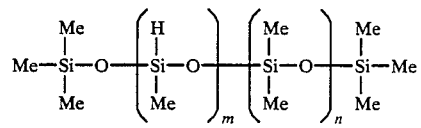

where Me is a methyl group, m is an integer from 1 to 200 and n is 0 or an interger from 1 to 200.

The polysiloxane containing reactive functional groups is of the general formula

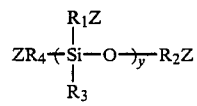

wherein
y is an integer $>6$;
$R_1$ is a covalent bond or alkylene of 1 to 20 carbon atoms;
$R_2$, $R_3$ and $R_4$ are alkylene of 1 to 20 carbon atoms;
Z is selected from —OH, —X, —H, —COOH, —COH, and a reactive functional group and at least one Z is a reactive functional group;
reactive functional group is selected from —COX, —SO$_2$X, —NCO, —POXR', —NRCOX, RC=CR, RC≡CR, RN=NR, R—O—O—R, and

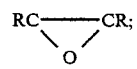

R is —H or R' or R'';
R' is alkyl, alkenyl, alkoxy or aryl containing from 1 to 18 carbon atoms;
R'' is alkylene, alkenylene, alkoxylene or arylene containing from 1 to 18 carbon atoms; and X is halide.

A particularly preferred polysiloxane is that containing acid halide functional groups. Such polysiloxanes may be prepared generally by polymerization of the dimethylsiloxane cyclic tetramer with a dicarboxypropyl siloxane end blocker according to reaction scheme I below to form a carboxylic-acid terminated polysiloxane. This carboxylic acid-terminated polysiloxane is then preferably converted to the corresponding acid halide by refluxing the acid with a diacid halide, for example, oxalylchloride, as shown in reaction scheme II below. In both reaction schemes, "Me" symbolizes a methyl group. Since the reaction scheme is exemplary only, it should be understood that the siloxane portion of the compounds shown may be derivatives other than the dimethyl derivatives shown, such as diphenylsiloxane, dipropylsiloxane, and di-(trifluoromethyl)siloxane.

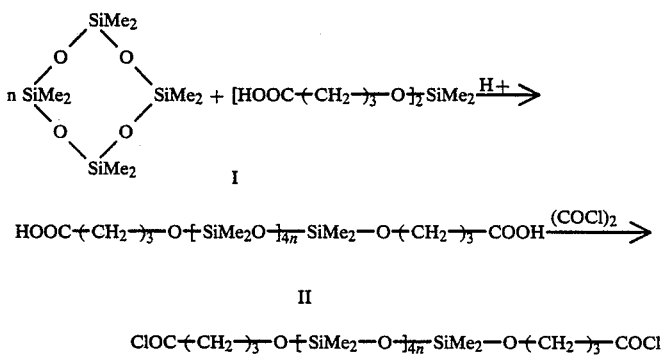

It should be noted that the above reaction shemes are representative only, and that any synthesis that yields the appropriate siloxane containing hydroxyl-reactive functional groups may be used. Specifically, any dicarboxyalkyl endblocker reactant may be used in place of the dicarboxypropyl reactant shown, where the alkyl group contains from 1 to 20 carbons, and any synthesis that will yield any of the other hydroxyl-reactive functional groups noted above will work.

The so-prepared polysiloxane containing acid halide functional groups may then enter into the condensation reaction with the cellulosic support membrane by placing it in solution, preferably 0.05 to 5.0 wt%, and festooning the cellulosic membrane therethrough with a residence time from 20 seconds to several minutes, depending upon polysiloxane concentration, about 1 minute in a 0.1 wt% solution.

Other examples of hydroxyl-reactive siloxanes and methods of making the same, organized by the particular functional group follow.

$SO_2X$: Starting from mercaptopropyl-substituted siloxane (Product No. PS850 Petrach Systems of Bristol, Pennsylvania), $SO_2X$-functionalized siloxane is obtained by oxidation of the mercapto group to the sulfonic acid siloxane which in turn is treated with thionyl chloride.

NCO: Starting with the carboxypropyl-terminated siloxane described above, the isocyanate-terminated siloxane is made by reaction with sodium azide to form the acylazide which, upon heating, forms the isocyanate via the Curtius reaction, set forth in *Advanced Organic Chemistry*, McGraw Hill (1968).

POXR': Starting from hydroxyethoxypropyl-terminated polysiloxane (Product No. PS558 from Petrarch Systems) the phosphonylhalide is made by reaction with $POCl_3$ followed by hydrolysis to form the phosphate-terminated siloxane, which in turn is converted to the phosphoryl product by reaction with thionyl chloride.

NRCOX: Aminopropyl-terminated polysiloxane (Product No. PS510 or PS513 from Petrarch Systems) is converted to the desired product by reaction with thionyl chloride (*Advanced Organic Chemistry, Ibid*).

Polymethylhydrosiloxane is available from Petrarch Systems as Product Nos. PS118, PS119, PS120 and PS122.

Polysiloxanes containing vinyl functional groups are commercially available from various sources, for example, Petrarch Systems of Bristol, Pennsylvania, makes and sells a number of vinyl group-containing polysiloxanes under the denominations PS463 and PS 4883. SWS Silicones Corporation of Adrian, Michigan makes and sells nine different acrylate- and methacrylate-containing polysiloxanes under its "F" series of silicone fluids.

Polysiloxanes containing epoxy groups are made and sold under the designation PS828 by Petrarch Systems.

Exemplary free radical initiators include the azo compound azo-bis-isobutylnitrile available as Product No. A37050 from Pfaltz and Bana, Inc. of Waterbury, Connecticut; the peroxide compound dibenzoylperoxide, made and sold by Aldrich Chemical Company of Milwaukee, Wisconsin, as Product No. 17,998-1; and the epoxide compound epichlorohydrin.

The improvement of the siloxane-grafted membranes of the present invention over conventional asymmetric cellulosic membranes in the rate of flux decline is dramatic, the siloxane-grafted membranes often showing a decrease in the rate of flux decline of a full order of magnitude. Selectivity is improved very substantially as well.

EXAMPLE 1

A relatively selective asymmetric "skinned" cellulosic membrane having a $CO_2/CH_4$ selectivity of 35 was prepared from a casting dope comprising, by approximate weight percentages, 15% cellulose acetate; 20% acetone; 45% dioxane; 5% methanol; and 15% acetic acid. A film was cast on a nylon web, then gelled by immersion in a 2° C. water bath for 10 minutes, followed by removal of the gelled membrane from the nylon web, a water wash, and annealing by immersion in a 85° C. water bath for 20 minutes. Water was removed from the membrane by solvent exchange with isopropanol and hexane, so as to form an asymmetric cellulose acetate gas separation membrane comparable to those known and used in the gas separation industry.

Di-carboxypropylacid-terminated poly(dimethylsiloxane) was synthesized by polymerizing the dimethyl-substituted siloxane cyclic tetramer octamethylcyclotetrasiloxane with the dicarboxypropyl endblocker 1,3-bis(3-carboxypropyl)tetramethyldisiloxane. Specifically, a 1-liter round-bottom flask was charged with 296.6 g of the tetramer, 19.2 g of the endblocker and 8.0 g of Amberlyst 15 cation exchange resin, and the contents stirred and heated to 110° C. for 16 hours under a nitrogen purge. Thereupon, the contents were cooled and the resin filtered off. The resulting product was washed with a 1 M sulfuric acid solution, and dryed in the presence of a dessicant. Unpolymerized monomers were removed by wet film evaporation to obtain an 80% yield of the carboxylic acid-terminated polymer. 20 g of the polymer, 150 ml dry toluene, and 75 ml oxalylchloride were charged to an oven-dried, half liter round-bottom flask and refluxed for 24 hours. The product was cooled and excess toluene and oxalyl chloride were removed by vacuum distillation to yield the corresponding acid chloride.

This so-prepared polysiloxane containing acid chloride functional group was made into a 0.1 wt% solution with hexane as the solvent and placed in a dip tank. The cellulosic support membrane prepared as noted above was then festooned through the acid chloride-containing polysiloxane solution with an average 1-minute residence time, followed by a water spray and air drying to yield the polysiloxane-grafted cellulosic membrane of the present invention.

EXAMPLE 2

The gas separation performance of the siloxane-grafted membrane of Example 1 was compared to the non-grafted cellulosic membrane of Example 1 by directing a feed mixture of $CO_2$ at 100 psi and $CH_4$ at 300 psi to the feed side of a 6.5 cm diameter flat sheet membrane of the two types and the $CO_2$ permeabilities ("P"), $CO_2/CH_4$ selectivities ("S"), and fluxes were measured initially, after 20 days of desktop storage, and after being subjected to 1000 psi of nitrogen differential pressure ("$N_2$ press") for one week. The results are noted in Table I.

TABLE I

| Membrane Type | Initial P/S | % J Loss 20 Days | % J Loss $N_2$ press |
|---|---|---|---|
| Non-grafted | 12/35 | 20% | 60% |
| Grafted | 10/38 | 2% | 13% |

Formation of a graft copolymeric bond between the cellulosic support and the acid halide-containing polysiloxane was confirmed by Soxlhet extraction studies with hexane coupled with $CO_2/CH_4$ separation performance and analysis of siloxane content by X-ray fluorescence. The grafted membrane exhibited a slight gain in $CO_2$ permeability to 10.5 and a small drop in $CO_2/CH_4$ selectivity to 37.

EXAMPLE 3

A relatively poorly selective asymmetric cellulosic membrane having a $CO_2/CH_4$ selectivity of 0.9 was prepared in the same manner as Example 1 from a casting dope comprising, by approximate weight percentages, 16.0% cellulose acetate; 10.0% acetone; 61.5% dioxane; 12.5% methanol. In this case, however, the acetone was not permitted to evaporate, yielding a non-skinned membrane.

The same acid-halide-terminated polysiloxane as in Example 1 was prepared in the same manner as in Example 1, formed into a 0.1 wt% hexane solution in a dip tank and the poorly selective cellulosic support membrane festooned therethrough to prepare the polysiloxane-grafted cellulosic membrane. This grafted membrane was then sprayed with a fine mist of water and allowed to dry.

The same extraction studies and $CO_2/CH_4$ separation performance tests and siloxane analysis mentioned in Example 2 were conducted on the grafted membrane and on a substantially identical asymmetric cellulosic support membrane, the surface of which was merely coated with poly(dimethyl)-siloxane. The membrane prepared in accordance with the present invention exhibited a 55% loss of siloxane content and a 50% loss in $CO_2/CH_4$ selectivity, while the siloxane-coated membrane showed a 99% loss of siloxane content and an 87% loss in performance.

EXAMPLE 4

The gas separation performance of the siloxane-grafted membrane of Example 3 was compared to the non-grafted cellulosic membrane of Example 1 in the same manner as in Example 2. The results are noted in Table II.

TABLE II

| Membrane Type | Initial P/S | % J Loss 20 Days | % J Loss N press |
|---|---|---|---|
| Non-grafted | 12/35 | 20% | 60% |
| Grafted | 21/31 | 1% | 15% |

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A siloxane-grafted cellulosic semipermeable composite membrane comprising chemical structure for providing a substantially constant flux as a function of time, consisting essentially of non-crosslinked covalently bonded reaction product of hydroxyl-reactive functional groups of a polysiloxane with hydroxyl groups of an asymetric cellulosic semipermeable membrane, wherein said hydroxyl-reactive functional groups are selected from acid halides, aminoacid halides, sulfonyl halides, and phosphoryl halides.

2. The membrane of claim 1 wherein said asymetric cellulosic semipermeable membrane is formed from cellulosic materials selected from regenerated cellulose, ethyl cellulose, cyanoethylated cellulose, hydroxypropyl cellulose, cellulose acetate, cellulose diacetate, cellulose triacetate, cellulose propionate, cellulose butyrate, cellulose acetate methacrylate, cellulose acetate butyrate, cellulose nitrate, and blends thereof, and wherein said polysiloxane is a polysiloxane containing reactive functional groups of the formula

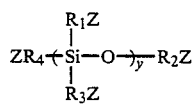

wherein y is an integer $\geq 6$;

$R_1$ is a covalent bond or alkylene of 1 to 20 carbon atoms;

$R_2$, $R_3$ and $R_4$ are alkylene of 1 to 20 carbon atoms;

Z is selected from —OH, —X, —X, —H, —COOH, —COH, and a reactive functional group and at least one Z is a reactive functional group;

reactive functional group is selected from —COX, —SO$_2$X, —POXR", and —NRCOX;

R is —H or R' or R";

R' is alkenyl, akyloxy or aryl containing from 1 to 18 carbon atoms;

R" is alkylene, alkenylene, alkoxylene or arylene containing from 1 to 18 carbon atoms; and X is halide.

3. The membrane of claim 1 or 2 surface-treated with a non-solvent swelling agent while the bulk of the membrane contains a hydrophobic organic liquid that is immiscible with the swelling agent.

4. The membrane of claim 3 wherein the swelling agent is water.

5. The membrane of claim 4 wherein the water is sprayed on the surface of said membrane.

6. The membrane of claim 1 or 2 in a form selected from a flat sheet, a fiber, a hollow fiber and a bead.

7. The membrane of claim 1 or 2 rolled into a spiral wound element.

* * * * *

UNITED STATES PATENT AND TRADEMARK OFFICE
CERTIFICATE OF CORRECTION

PATENT NO. : 4,877,528
DATED : Oct. 31, 1989
INVENTOR(S) : Dwayne T. Friesen, Alan S. Obligin It is certified that error appears in the above-identified patent and that said Letters Patent is hereby corrected as shown below:

Col. 4, Line 22: Change "SCFH/ft$^2$.100" to --SCFH/ft$^2 \cdot$100--;

Col. 4, Line 49: Change "$>$ " to --$>$--.

Col. 5, Line 32: Insert --(Polysiloxane containing acid halide functional groups)--;

Col. 5, Line 54: Change "pretrach" to --Pretarch--.

Col. 9, Line 9: Change "R";" to --R';--

Signed and Sealed this

Twentieth Day of August, 1991

Attest:

HARRY F. MANBECK, JR.

Attesting Officer
Commissioner of Patents and Trademarks